(12) United States Patent
Hasan et al.

(10) Patent No.: US 9,600,384 B2
(45) Date of Patent: Mar. 21, 2017

(54) SYSTEM-ON-CHIP VERIFICATION

(71) Applicant: Spansion LLC, Sunnyvale, CA (US)

(72) Inventors: Qamrul Hasan, Santa Clara, CA (US);
William Chu, Sunnyvale, CA (US);
Lijun Pan, Beijing (CN); Hongjun Xue, Beijing (CN)

(73) Assignee: Cypress Semiconductor Corporation, San Jose, CA (US)

( * ) Notice: Subject to any disclaimer, the term of this patent is extended or adjusted under 35 U.S.C. 154(b) by 288 days.

(21) Appl. No.: 14/513,361

(22) Filed: Oct. 14, 2014

(65) Prior Publication Data

US 2016/0103723 A1    Apr. 14, 2016

(51) Int. Cl.
*G06F 17/50* (2006.01)
*G06F 11/22* (2006.01)

(52) U.S. Cl.
CPC .......... *G06F 11/22* (2013.01); *G06F 17/5031* (2013.01); *G06F 2217/84* (2013.01)

(58) Field of Classification Search
CPC ............. G06F 17/5031; G06F 2217/84; G06F 2217/86; G01R 31/318314
USPC ......... 716/100, 106, 108, 132, 134; 717/136
See application file for complete search history.

(56) References Cited

U.S. PATENT DOCUMENTS

| | | | | |
|---|---|---|---|---|
| 6,868,545 B1 * | 3/2005 | Devins | ................ | G06F 17/5045 714/734 |
| 6,993,469 B1 * | 1/2006 | Bortfeld | ............. | G06F 17/5022 703/13 |
| 7,194,705 B1 * | 3/2007 | Deepak | ............... | G06F 17/5022 703/16 |
| 7,607,116 B2 * | 10/2009 | Kwon | ................ | G06F 17/5022 703/1 |
| 7,613,599 B2 * | 11/2009 | Bade | ................... | G06F 17/5022 703/14 |

(Continued)

*Primary Examiner* — Stacy Whitmore

(57) ABSTRACT

Disclosed herein are method, system and computer program product embodiments for improving the verification process of a system on chip (SoC). An embodiment operates by employing an active interconnect (AIC) between a processing subsystem (e.g., a central processing unit or CPU) and a plurality of peripherals, wherein the processing subsystem is linked to a plurality of applications via a plurality of drivers, and implementing a common set of software codes by at least one of the applications for a software development process and a hardware verification process. The AIC includes a plurality of communication protocols. During the software development process, the AIC configures at least one of the communication protocols to not enforce a timing limitation on one or more transactions between the processing subsystem and at least one of the peripherals, and a high-level programming language model is used for the peripherals. During the hardware verification process, the AIC configures at least one of the communication protocols to enforce a timing limitation on one or more transactions between the processing subsystem and at least one of the peripherals, and a register-transfer level model is used for a least one of the plurality of peripherals. The AIC may further configure at least one of the communication protocols to enforce one or more constraints on the transactions to achieve increased hardware verification coverage.

15 Claims, 10 Drawing Sheets

(56) References Cited

U.S. PATENT DOCUMENTS

| | | | | |
|---|---|---|---|---|
| 7,957,950 B2* | 6/2011 | Ito | G06F 17/5022 | 703/14 |
| 8,285,535 B2* | 10/2012 | Braun | G06F 17/5022 | 703/14 |
| 8,326,592 B2* | 12/2012 | McMillan | G06F 17/5022 | 703/14 |
| 8,463,589 B2* | 6/2013 | Clark | G06F 17/5022 | 703/22 |
| 8,639,487 B1* | 1/2014 | Ezer | G06F 17/505 | 703/13 |
| 8,793,628 B1* | 7/2014 | Varma | G06F 17/5027 | 703/13 |
| 8,886,509 B2* | 11/2014 | Bailey | G06F 17/5022 | 703/14 |
| 8,943,449 B1* | 1/2015 | Varma | G06F 17/5027 | 716/106 |
| 9,015,649 B2* | 4/2015 | Mehta | G06F 17/5022 | 717/104 |
| 2004/0260531 A1* | 12/2004 | Buckley | G06F 11/261 | 703/25 |
| 2005/0102640 A1* | 5/2005 | Iwamoto | G06F 11/261 | 716/102 |
| 2005/0149897 A1* | 7/2005 | Yamashita | G01R 31/31831 | 716/106 |
| 2006/0236300 A1* | 10/2006 | Lajolo | G06F 17/5045 | 717/100 |
| 2006/0259879 A1* | 11/2006 | Chetput | G06F 17/505 | 716/103 |
| 2007/0271080 A1* | 11/2007 | Tatsuoka | G06F 17/5045 | 703/13 |
| 2008/0163143 A1* | 7/2008 | Kwon | G06F 17/5022 | 716/107 |
| 2008/0215304 A1* | 9/2008 | Bailey | G06F 17/5022 | 703/14 |
| 2008/0288231 A1* | 11/2008 | Nakayama | G06F 17/5022 | 703/15 |
| 2008/0319730 A1* | 12/2008 | Clark | G06F 17/5022 | 703/19 |
| 2009/0164193 A1* | 6/2009 | McMillan | G06F 17/5022 | 703/13 |
| 2010/0017185 A1* | 1/2010 | Bade | G06F 17/5022 | 703/13 |
| 2010/0324880 A1* | 12/2010 | Braun | G06F 17/5022 | 703/14 |
| 2011/0041106 A1* | 2/2011 | Li | G06F 17/5022 | 716/106 |
| 2011/0307233 A1* | 12/2011 | Tseng | G06F 17/5022 | 703/14 |
| 2011/0307847 A1* | 12/2011 | Liao | G06F 17/5027 | 716/103 |
| 2012/0017197 A1* | 1/2012 | Mehta | G06F 17/5022 | 717/104 |
| 2012/0022847 A1* | 1/2012 | Bailey | G06F 17/5022 | 703/14 |
| 2012/0311513 A1* | 12/2012 | Kurshan | G06F 17/504 | 716/106 |
| 2013/0124183 A1* | 5/2013 | Braun | G06F 17/5022 | 703/14 |
| 2015/0039282 A1* | 2/2015 | Sylvester | G06F 17/5022 | 703/13 |
| 2015/0193568 A1* | 7/2015 | Mehta | G06F 17/5022 | 716/138 |

* cited by examiner

SYSTEM-ON-CHIP VERIFICATION

BACKGROUND

A system on chip (SoC), such as microcontroller unit (MCU), includes software and hardware that are custom designed. The intricacies of the interdependencies between the software and hardware components require extensive validation prior to production of the SoC. Given the competitiveness of the electronics industry, time to market is critical. Consequently, manufacturers of such systems strive to reduce the duration of software development process and hardware verification process.

The software development process and hardware verification process are typically performed independently, but in parallel, ensuring that the SoC meets predetermined design requirements. The functionality of software may be validated using an instruction set simulator. The hardware verification process may be done using a hardware simulator or emulator. Software and hardware are generally not tested together until a prototype of the hardware is available, which is typically at the latter part of the hardware development process. It is common for the software development process and hardware verification process to have overlapping test cases. However, in such cases, there is parallel effort to write multiple sets of software codes independently, using multiple programming languages, albeit one set of software code could be translated and re-used for another to generate the same test case.

In order to share software codes between the software development process and hardware verification process, software/hardware co-verification processes are sometimes used. However, existing software/hardware co-verification processes can only achieve functional behavior validity testing between hardware components and their software counterparts, and tend to ignore non-functional system aspects such as scheduling, timing, etc. For example, existing co-verification processes do not test for corner-case constraints enforced on transactions via an interconnect, which bridges a central processing unit (CPU) of the SoC and its hardware peripherals. An example of such a corner-case constraint is a command queue stall, which undesirably imparts command queues out of order, potentially leading to communication failures. Therefore, the development process related to interconnects requires an additional level of verification at a low-level hardware layer to cover test case scenarios that are not reachable from a high-level application layer of existing software/hardware co-verification processes.

SUMMARY

Provided herein are method, system and computer program product embodiments, and/or combinations and subcombinations thereof, for improving the verification process of a system on chip (SoC).

An embodiment includes a SoC verification method. The method operates by employing an active interconnect (AIC) between a processing subsystem (e.g., a central processing unit or CPU) and a plurality of peripherals, wherein the processing subsystem is linked to a plurality of applications via a plurality of drivers, and implementing a common set of software codes by at least one of the plurality of applications for a software development process and a hardware verification process. The AIC includes a plurality of communication protocols. During the software development process, the method causes the AIC to configure at least one of the communication protocols to not enforce a timing limitation on one or more transactions between the processing subsystem and at least one of the plurality of peripherals, and uses a high-level programming language model for the peripherals. During the hardware verification process, the method causes the AIC to configure at least one of the plurality of communication protocols to enforce a timing limitation on one or more transactions between the processing subsystem and at least one of the peripherals, and uses a register-transfer level (RTL) model for the peripherals. The method may further cause the AIC to configure at least one of the plurality of communication protocols to enforce one or more constraints on the transactions to achieve increased hardware verification coverage.

Another embodiment includes a SoC verification system. The system comprises a processing subsystem, an AIC including a plurality of communication protocols, a plurality of applications linked to the processing subsystem via a plurality of drivers, a plurality of peripherals linked to the processing subsystem via the AIC, and a common set of software codes implemented by at least one of the applications to perform a software development process and a hardware verification process. During the software development process, the AIC configures at least one of the communication protocols to not enforce a timing limitation on one or more transactions between the processing subsystem and at least one of the plurality of peripherals, and a high-level programming language model is used for the peripherals. During the hardware verification process, the AIC configures at least one of the plurality of communication protocols to enforce a timing limitation on one or more transactions between the processing subsystem and at least one of the plurality of peripherals, and a RTL model is used for the peripherals. The AIC may further configure at least one of the plurality of communication protocols to enforce one or more constraints on the one or more transactions to achieve increased hardware verification coverage.

A further embodiment includes a tangible computer-readable device having instructions stored thereon that, when executed by at least one computing device, cause the computing device to perform a SoC verification process. The SoC verification process includes employing an AIC between a processing subsystem and a plurality of peripherals, wherein the processing subsystem is linked to a plurality of applications via a plurality of drivers, and implementing a common set of software codes by at least one of the plurality of applications for a software development process and a hardware verification process. The AIC includes a plurality of communication protocols. During the software development process, the SoC verification process causes the AIC to configure at least one of the plurality of communication protocols to not enforce a timing limitation on one or more transactions between the processing subsystem and at least one of the plurality of peripherals, and uses a high-level programming language model for the peripherals. During the hardware verification process, the SoC verification process causes the AIC to configure at least one of the plurality of communication protocols to enforce a timing limitation on one or more transactions between the processing subsystem and at least one of the plurality of peripherals, and uses a RTL model for the peripherals. The SoC verification process may further cause the AIC to configure at least one of the communication protocols to enforce one or more constraints on the transactions to achieve increased hardware verification coverage.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
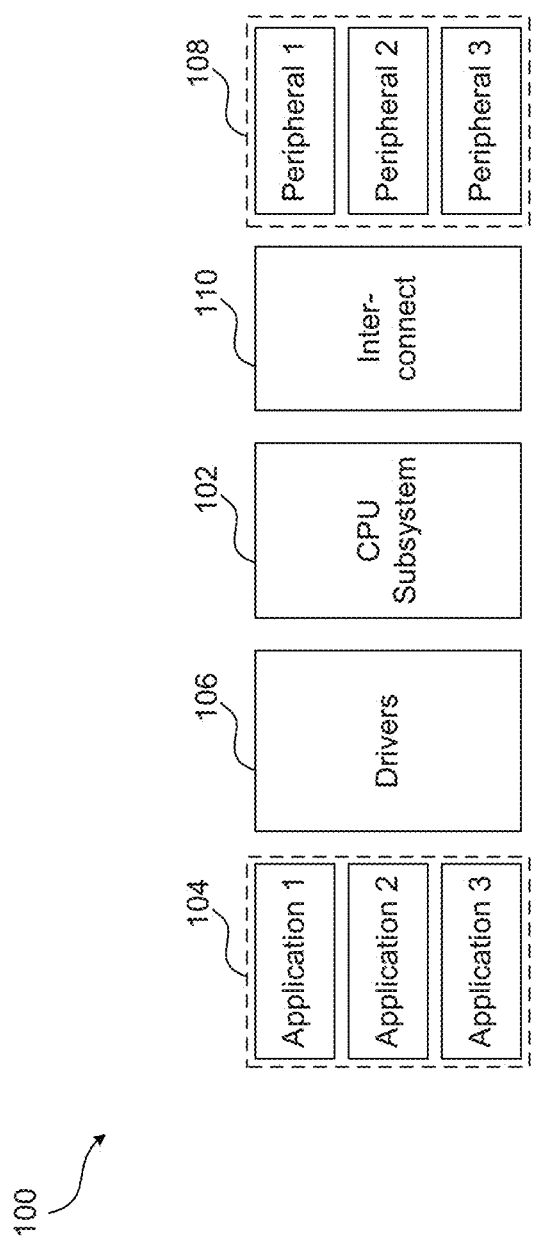
FIG. 1 is a representation of a system on chip (SoC), according to an example embodiment.

According to an embodiment, FIG. 1 is a representation of a system on chip (SoC) 100. SoC 100 comprises a central processing unit (CPU) subsystem 102, which processes instructions and data flow between a plurality of applications 104 and a plurality of peripherals 108, also known as peripheries. In FIG. 1, SoC 100 includes, but is not limited to, three applications and three peripherals. An example of a peripheral may be a controller unit that communicates with a memory device, which is external to SoC 100 and which is not shown in FIG. 1. Between CPU subsystem 102 and the plurality of applications 104 are a plurality of drivers 106, used to interface the applications 104 to CPU subsystem 102. In an embodiment, the drivers 106 are configured to (among other things) translate high-level programming language software codes from the applications 104 into lower-level programming language inputs compatible with the CPU subsystem 102. The plurality of peripherals 108 interface with CPU subsystem 102 via an interconnect 110. The timing of transactions between CPU subsystem 102 and the plurality of peripherals 108 via interconnect 110 is determined by the internal scheduling of CPU subsystem 102. As the number of peripherals increases, to expand the SoC's functionalities for example, the timing of transactions through the interconnect becomes critical. An untested scenario in interconnect transactions may lead to architectural problems or malfunctions of the peripherals, limiting the use of the SoC for certain applications. Such a scenario may be uncovered after the production of the SoC and may be resolved through iteration of the SoC's interconnect design and a re-spin of the SoC on silicon, undesirably delaying the time to market. It is thus important to perform elaborate interconnect testing, covering multiple data traffic scenarios seen by the interconnect throughout the modeling, simulation and fabrication stages of the SoC's development.

Figure 2:
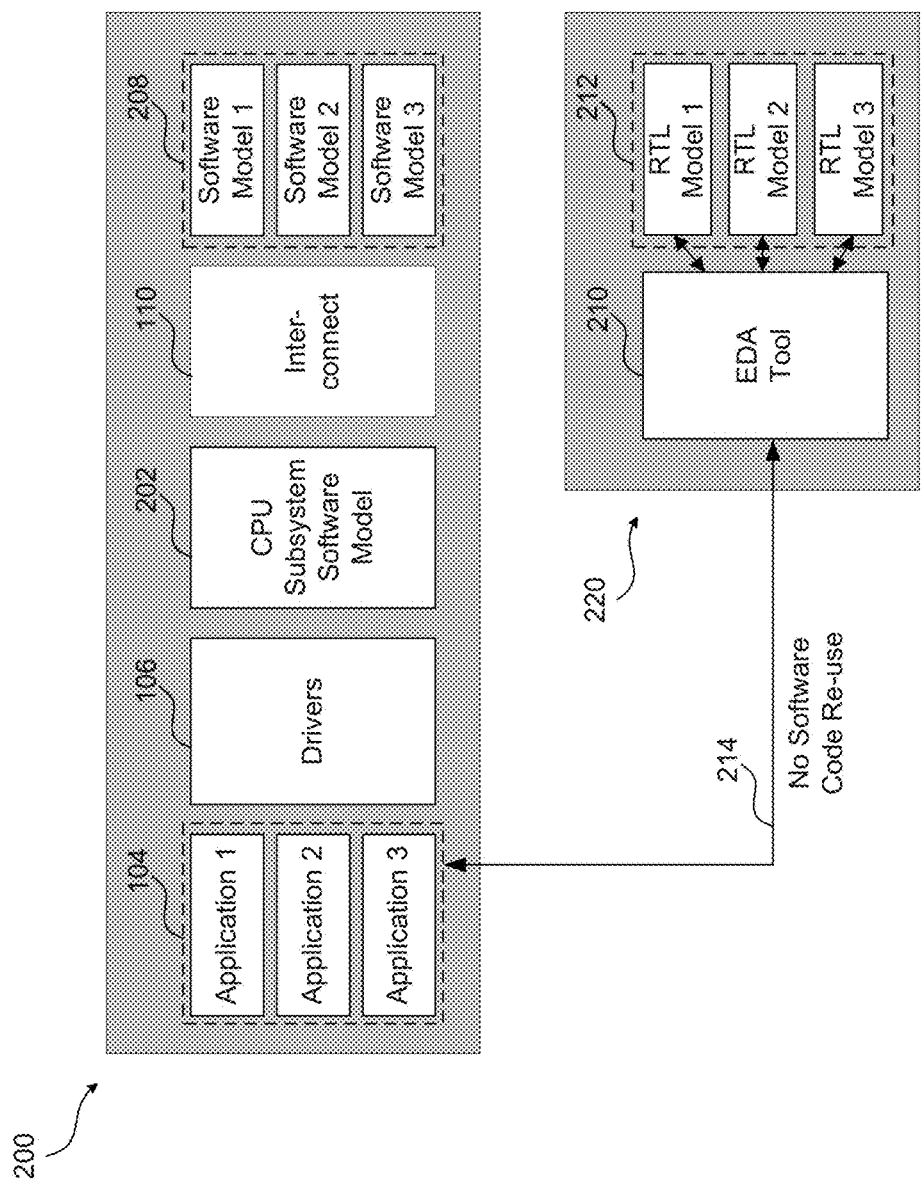
FIG. 2 illustrates configurations of the SoC for a software development process and a hardware verification process, according to an example embodiment.

FIG. 2 depicts example configurations of SoC 100 for a software development process 200 and a hardware verification process 220. For software development process 200, a CPU subsystem software model 202, coded in a high-level programming language for example, may be used to model the CPU subsystem 102 of FIG. 1. For example, CPU subsystem software model 202 may be in the form of an instruction set simulator (ISS) or a System C model. Such CPU subsystem models may be available from the manufacturers of the CPU subsystems. The applications 104 and the drivers 106 may not need to be modeled for software development process 200. Applications and drivers intended for the production of SoC 100 may be used directly to generate transactions over interconnect 110. A plurality of software models 208 may be used to model the plurality of peripherals 108 of FIG. 1. For example, the plurality of software models 208 may be coded in a high-level programming language such as C. Since modeling of CPU subsystem software model 202 and the plurality of software models 208 are performed in a high-level application layer, software development process 200 may not be able to test for corner-case interconnect transactions, such as stalls, congestions and interrupts. Such corner-case interconnect transactions may be tested at a low-level hardware layer. For this reason, software development process 200 may treat interconnect 110 as being in an ideal form, ignoring scheduling constraints and assuming no corner-case scenarios between CPU subsystem software model 202 and the plurality of software models 208.

Hardware verification process 220 may thus be needed to supplement the inability of software development process 200 to extensively test interconnect 110. Hardware verification process 220 may use an electronic design automation (EDA) tool 210 in lieu of CPU subsystem software model 202, the plurality of applications 104 and/or the plurality of drivers 106. An example of EDA tool 210 is Verification Interface Protocol (VIP), which performs the verification of a SoC design against the requirements of multiple communication protocols and covers multiple ways of completing a transaction over an interconnect between a CPU and its peripherals. In hardware verification process 220, a plurality of register-transfer level (RTL) models 212 may be used to model the plurality of peripherals 108 of FIG. 1, such that the flow of digital signals over interconnect 110 and operations performed on those digital signals may be adequately modeled. In EDA tool 210, test case scenarios, including corner-case interconnect transactions, are coded using a hardware description language (HDL).

In an embodiment, software development process 200 and hardware verification process 220 may be performed independently of each other. For example, in the software development process 200, test cases may be written in high-level programming languages in the plurality of applications 104 or CPU subsystem software model 202 to generate interconnect transactions. In hardware verification process 220, test cases may be written in HDL in EDA tool 210 to also generate interconnect transactions. However, aside from the corner-case interconnect transactions, software development process 200 and hardware verification process 220 may generate similar transactions over interconnect 110. In other words, there may be parallel effort in the software and hardware domains to write multiple software codes that produce similar, if not exactly the same, transactions over interconnect 110. Nevertheless, in an embodiment, there is no re-use or sharing of the software codes between the software and hardware domains, as represented by arrow 214. The absence of software re-use between the software and hardware domains implies unnecessary parallel effort required to develop similar test cases to test the interconnect separately during software development process 200 and hardware verification 220. This independent parallel effort may translate into architectural and functional problems, which may be uncovered after the production of the SoC and which may require a costly re-spin of the SoC on silicon.

Figure 3:
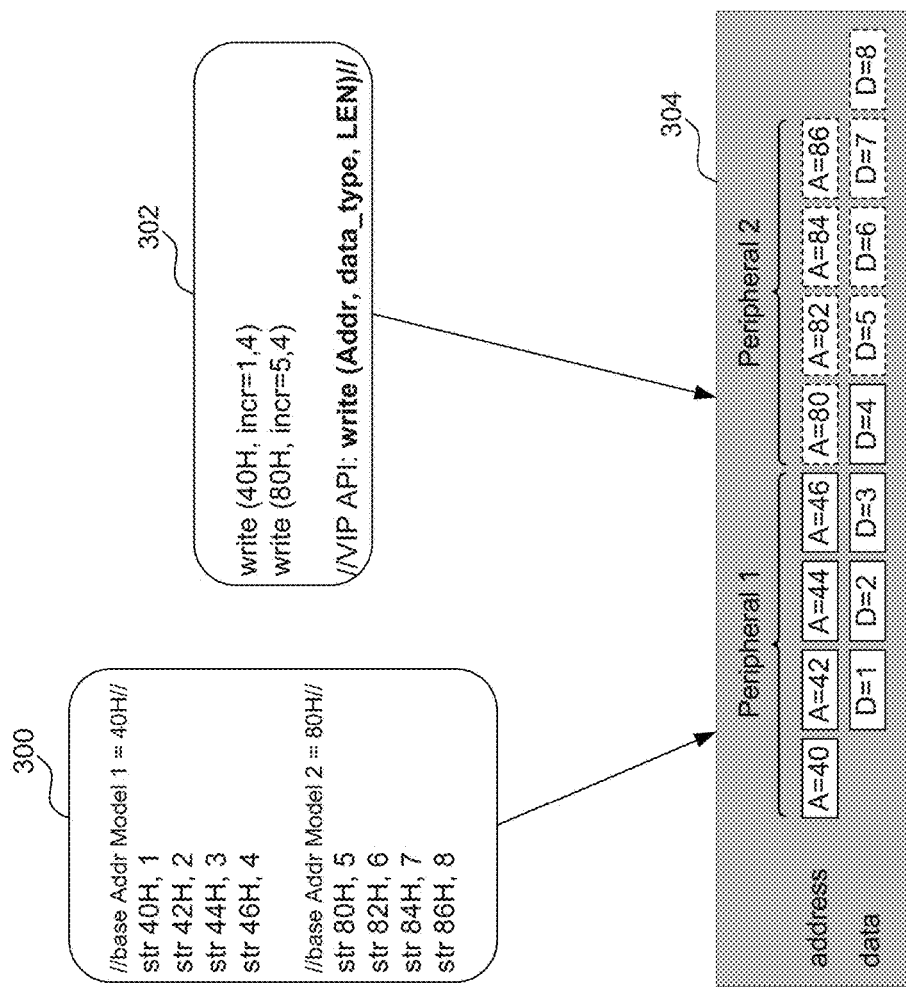
FIG. 3 illustrates a transaction generated over an interconnect, according to an example embodiment.

FIG. 3 depicts, according to an embodiment, an example wherein multiple pieces of software may generate the same transaction over an interconnect. A first software 300 is an example of C code that may be run on CPU subsystem software model 202 during software development process 200. First software 300 does not necessarily have to be written in C language. Other embodiments may use other high-level programming languages for first software 300. A second software 302 shows an example test case that may be run on EDA tool 210 during hardware verification process 220. In the example of FIG. 3, both first software 300 and second software 302, when executed, may result in transaction 304 over an interconnect, wherein data {1, 2, 3, 4} are stored in Peripheral 1 at addresses {40, 42, 44, 46} and data {5, 6, 7, 8} are stored in Peripheral 2 at addresses {80, 82, 84, 86}. A delay of one or more cycles may be present between a point at which an address location is stored into register and another point at which a corresponding data is written at the address location. The first software 300 may be translated and run on EDA tool 210 to provide the same transaction on the interconnect. Similarly, second software 302 may be translated and run on CPU subsystem software model 202. Therefore, the test case scenario embodiment shown in FIG. 3 may enable the re-use of software codes between the software and hardware domains.

Figure 4:
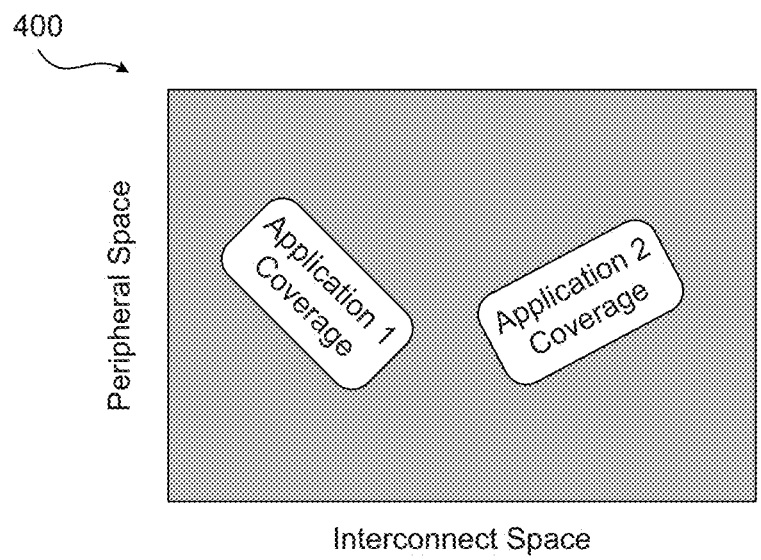
FIG. 4 depicts hardware verification coverage under multiple test case scenarios, according to an example embodiment.
Figure 4:
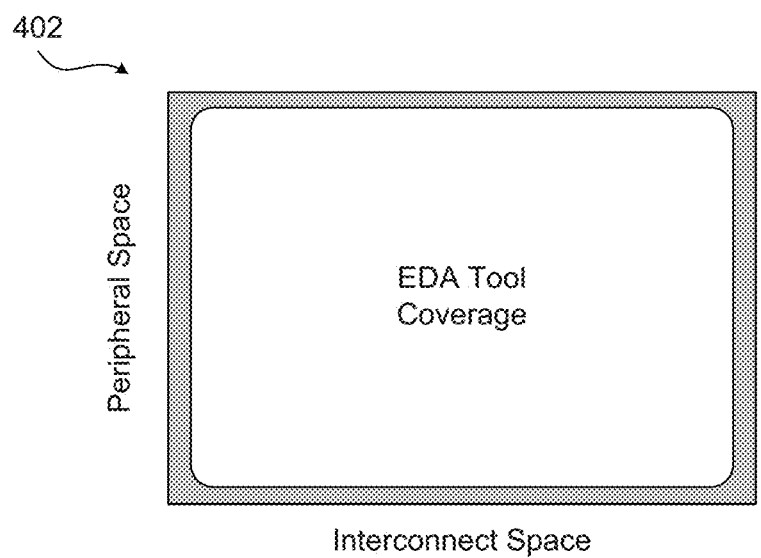

However, in some embodiments, solely translating software written for software development process 200 to be run for hardware verification process 220 may not provide the level of hardware verification coverage required for an SoC to be considered ready for production. FIG. 4 depicts, according to an embodiment, a general high-level comparison between an example software-driven verification coverage 400 and an example hardware-driven verification coverage 402. A 100% verification coverage may be considered as the set of permutations of transactions that may be carried out between an interconnect space and a peripheral space. For example, in an embodiment, software-driven verification coverage 400 illustrates the coverage that may be achieved by running test cases from Applications 1 and 2, in the applications 104, to generate transactions over interconnect 110 during software development process 200. In an example embodiment, hardware-driven verification coverage 402 illustrates the coverage that may be achieved by running test cases from EDA tool 210 during a hardware verification process 220. The relatively lower coverage of software-driven verification when compared to hardware-driven verification may be due to the inability of software-driven verification to cover corner-case interconnect transactions, such as stalls and congestions, even after multiple days of simulation. Examples of interconnect transaction scenarios, with and without constraints, are contrasted in FIGS. 5 and 6, respectively.

Figure 5:
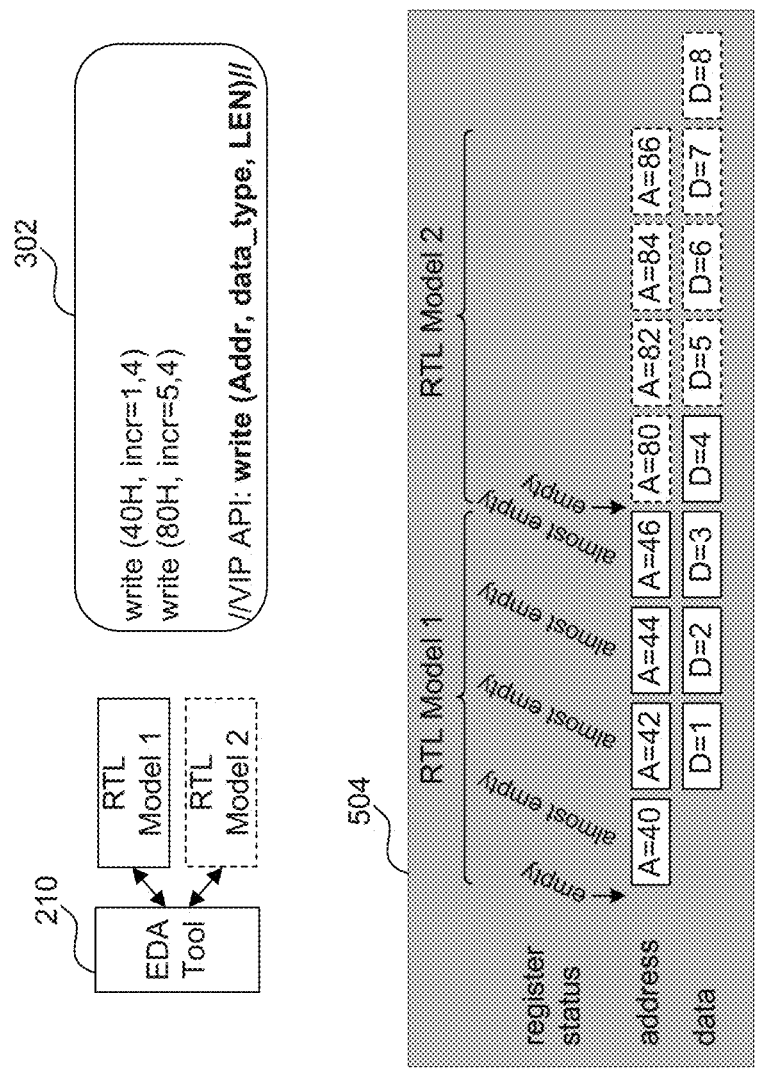
FIG. 5 illustrates a transaction generated over an interconnect during a hardware verification process under no constraint, according to an example embodiment.

FIG. 5 shows, according to an embodiment, EDA tool 210 linked to RTL Model 1 and RTL Model 2, modeling Peripheral 1 and Peripheral 2 in the plurality of peripherals 108, respectively. In this example scenario, RTL Model 1 may have a first-in-first-out (FIFO) register of depth 4 to store address locations of where data may be stored. Similar to FIG. 3, second software 302 may be used such that data {1, 2, 3, 4} are stored in RTL Model 1 at addresses {40, 42, 44, 46} and data {5, 6, 7, 8} are stored in RTL Model 2 at addresses {80, 82, 84, 86}. A delay of one or more cycles may be present between a point at which an address location is stored into the FIFO register and another point at which a corresponding data is written at the address location. In this example, EDA tool 210 does not enforce any constraint. Consequently, the resulting transaction 504 is similar to transaction 304. In FIG. 5, the status of the FIFO register of RTL Model 1 is shown. The register remains almost or entirely empty because, as an address is written in the FIFO register, the corresponding data is written in the subsequent cycle and the address is pushed out of the FIFO for the next address to be written. This interconnect transaction scenario may be covered by both software development process 200 and hardware verification process 220.

Figure 6:
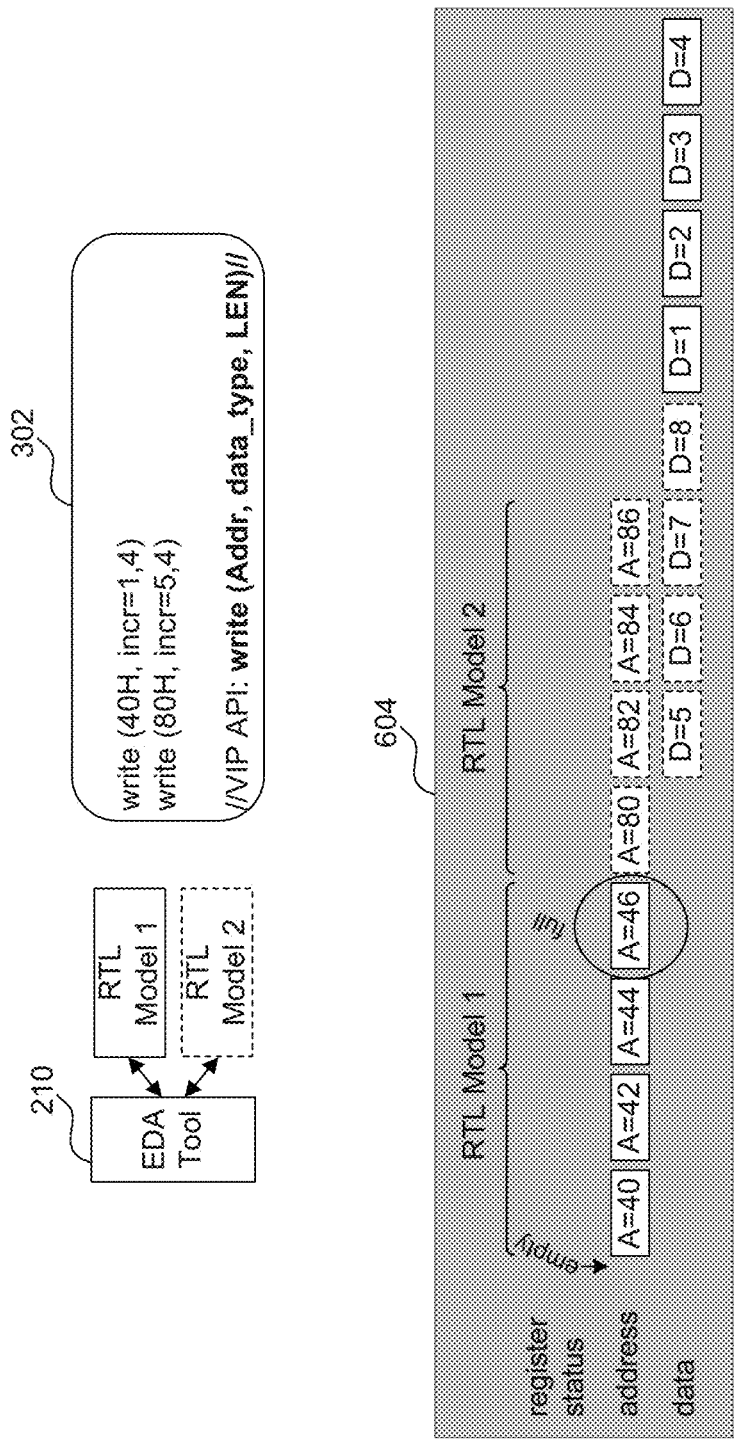
FIG. 6 illustrates a transaction generated over an interconnect during a hardware verification process under constraint, according to an example embodiment.

FIG. 6 shows, according to an embodiment, EDA tool 210 linked to RTL Model 1 and RTL Model 2, modeling Peripheral 1 and Peripheral 2 in the plurality of peripherals 108, respectively. RTL Model 1 may have a FIFO register of depth 4 to store address locations of where data may be stored. Unlike the test case scenario in FIG. 5, EDA tool 210 may be configured to enforce a corner-case test case to give higher priority to RTL Model 2 such that data has to be written in RTL Model 2 first. Second software 302 may be used to attempt to store data {1, 2, 3, 4} in RTL Model 1 at addresses {40, 42, 44, 46} and data {5, 6, 7, 8} in RTL Model 2 at addresses {80, 82, 84, 86}. However, data {1, 2, 3, 4} may not be written in RTL Model 1 until data {5, 6, 7, 8} are written in RTL Model 2. In such a test case scenario, as shown by transaction 604, EDA tool 210 may create cycles that make the FIFO register of RTL Model 1 full after storing the fourth address location 46. As a result, the command queue may stall, imparting command queues out of order, introducing undesirable and/or unexpected delays in run-time. Such an interconnect transaction scenario may not be covered by software-driven verification.

Figure 7:
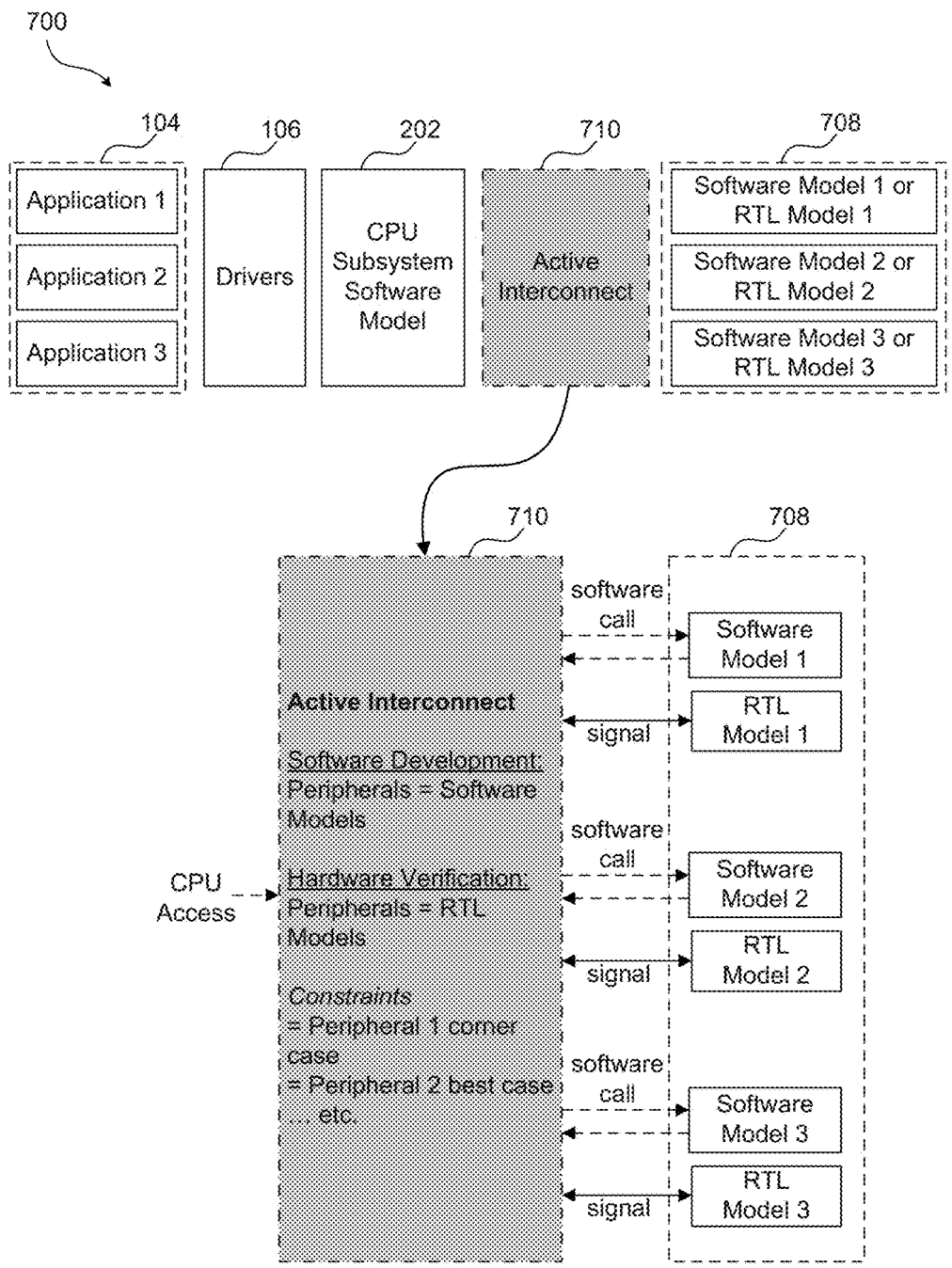
FIG. 7 is a representation of a SoC verification process with an active interconnect (AIC), according to an example embodiment.

A SoC verification process that uses an active interconnect (AIC), according to an example embodiment, to unify multiple test cases from both software and hardware domains, while achieving increased verification coverage, will now be described with respect to FIGS. 7 through 9. FIG. 7 is a representation of an example configuration for a SoC verification process 700, which is similar to the configuration for software development process 200 in FIG. 2, except that interconnect 110 has been replaced by an AIC 710 and a plurality of software models and RTL models 708 are used to model the plurality of peripherals 108 of FIG. 1. In an embodiment, AIC 710 may include a plurality of communication protocols needed to test interconnect transactions between the CPU subsystem software model 202 and the plurality of software models and RTL models 708. In an embodiment, the unified test cases may be a common set of software codes written in a high-level programming language, such as C, and running from the plurality of applications 104 to generate interconnect transactions. SoC verification 700 may thus use a common set of software codes to perform both software development process and hardware verification process.

Depending on whether software development process or hardware verification process is being performed, in an embodiment, AIC 710 may be configured to choose between software models (Software Models 1 through 3, for example) or RTL Models (RTL Models 1 through 3, for example), respectively. Furthermore, to achieve increased verification coverage during hardware verification, AIC 710 may configure the communication protocols to enforce constraints on the interconnect transactions, such that bottlenecks may be exposed and verification coverage increased such that the SoC may be considered ready for production. Therefore, the need to have additional test cases, written in HDL for example, may be eliminated. Accordingly, the use of an EDA tool such EDA tool 210 may also be eliminated.

Figure 8:
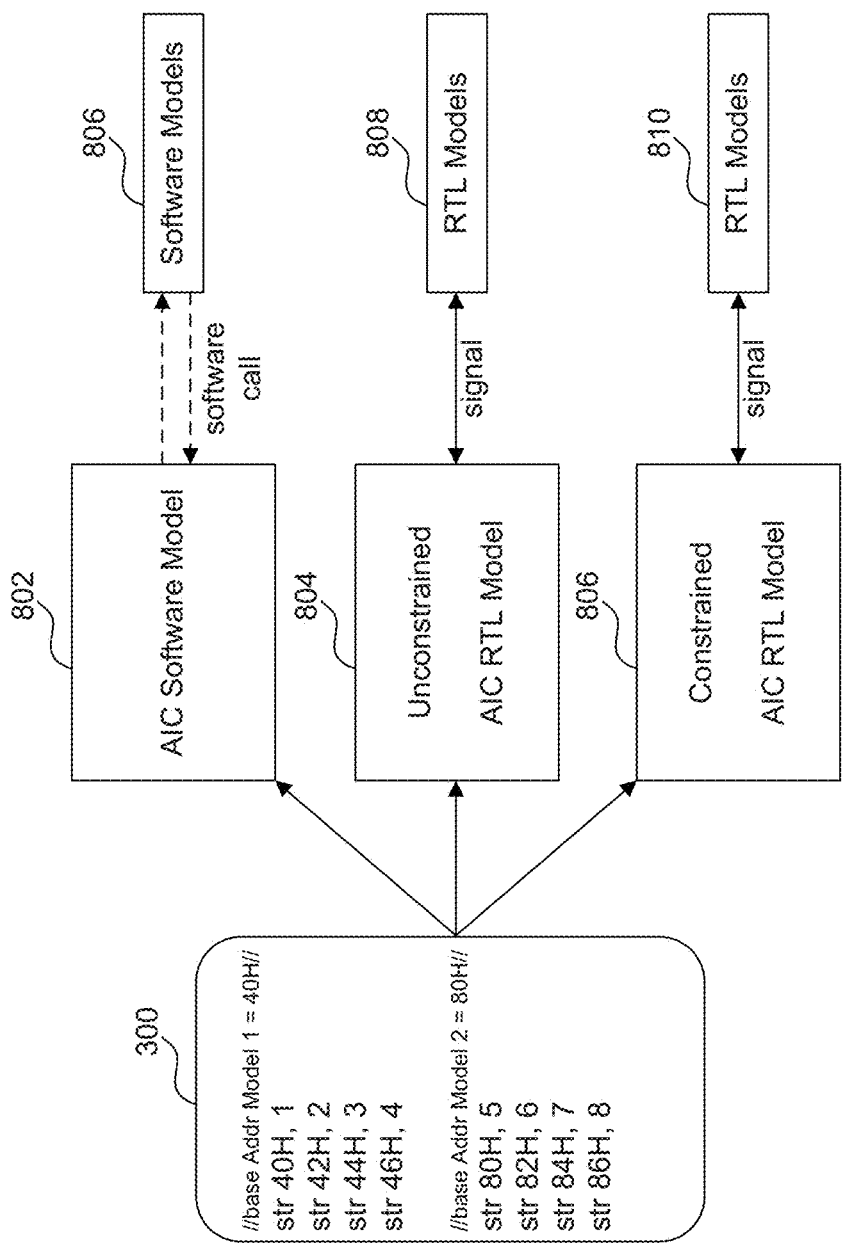
FIG. 8 illustrates configurations of the AIC under different test case scenarios, according to an example embodiment.

FIG. 8 further illustrates, according to an embodiment, how a common set of software code, first software 300 for example, in conjunction with multiple AIC configurations and peripheral models, may be used to generate interconnect transactions for both software development process and hardware verification. Under software development process, an AIC software model 802, written in a high-level programming language such as C, may be used, with the peripherals being software models 806. Under hardware verification process, an unconstrained AIC RTL model 804 or a constrained AIC RTL model 806 may be used, with the peripherals being RTL models 808 and 810, respectively. In unconstrained AIC RTL model 804, the communication protocols may enforce a timing limitation on the interconnect transactions to provide real-time data traffic scenarios. In constrained AIC RTL model 806, the communication protocols may further enforce constraints on the interconnect transactions to cover corner-case test scenarios, such as stalls, interrupts, etc., thus achieving increased verification coverage.

Figure 9:
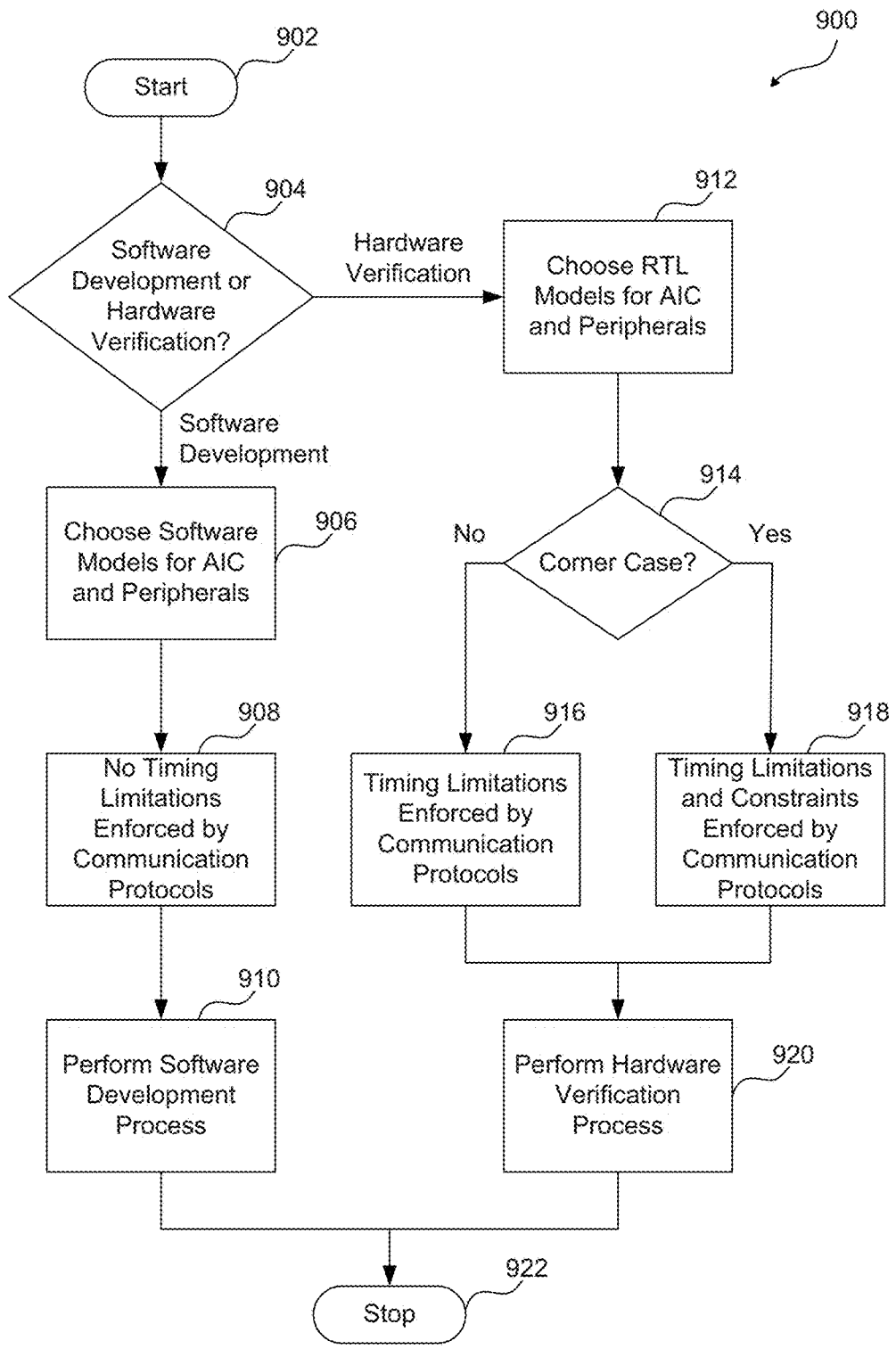
FIG. 9 is a flowchart illustrating the SoC verification process, according to an example embodiment.

FIG. 9 depicts a method 900 of performing the SoC verification process according to an example embodiment. FIG. 9 shall be described with reference to FIGS. 7 and 8, but it should be understood that method 900 is not limited to the example embodiments depicted in FIGS. 7 and 8.

As shown in FIG. 9, method 900 begins at step 902 where control passes to step 904. At step 904, it is determined whether a software development process or a hardware verification process needs to be performed. For a software development process, method 900 moves to step 906, wherein software models are chosen for the AIC and the peripherals (e.g. AIC software model 802 and software models 806, respectively).

At step 908, timing limitations are not enforced by the communication protocols included in the AIC on the interconnect transactions. In other words, the interconnects are treated as being in an ideal form and scheduling constraints are ignored.

At step 910, the software development process is performed using interconnect transactions generated from the software code (e.g. software 300) in the application layer (e.g., applications 104).

If the decision at step 904 is for a hardware verification process, method 900 moves to step 912, wherein RTL models are chosen for the AIC and the peripherals (e.g. AIC RTL models 804 or 806, and RTL models 808 or 810, respectively).

At step 914, a decision is made whether a corner case interconnect transaction needs to be tested. For no corner case interconnect transactions, method 900 moves to step 916, wherein the communication protocols enforce a timing limitation on the interconnect transactions to provide real-time data traffic scenarios.

At step 914, for corner case interconnect transactions, method 900 moves to step 918, wherein the communication protocols enforce a timing limitation and constraints on the interconnect transactions to cover corner-case test scenarios, such as stalls, interrupts, etc., to increase verification coverage.

At step 920, the hardware verification process is performed using interconnect transactions generated from the software code (e.g. software 300) in the application layer (e.g., applications 104). The SoC verification process ends at step 922.

In an embodiment, an AIC allows for the use of a common set of codes for both software development process and hardware verification process. The AIC thus eliminates the extra time and overhead required to write multiple sets of software codes, independently for the software and hardware domains, to generate similar test cases for interconnect testing. Moreover, the AIC may allow for detailed low-level hardware testing, but reachable from a high-level application layer. In other words, software and hardware verification may be placed on a common consolidated layer, without sacrificing testing accuracy in terms of interconnect transaction modeling and debugging. Additionally, due to the fact that the AIC can be configured as a high-level programming language software model, it may be possible to speed up the hardware verification process by considerably reducing the boot time for hardware verification. For these reasons, the time to bring the SoC to production is reduced, resulting in a shorter time to market. Moreover, the flexibility of the AIC to accommodate constantly-changing constraints provides an improved platform for future development of SoCs. This SoC verification method may also allow for software drivers to be developed and tested in the same verification environment.

Example Computer System

Figure 10:
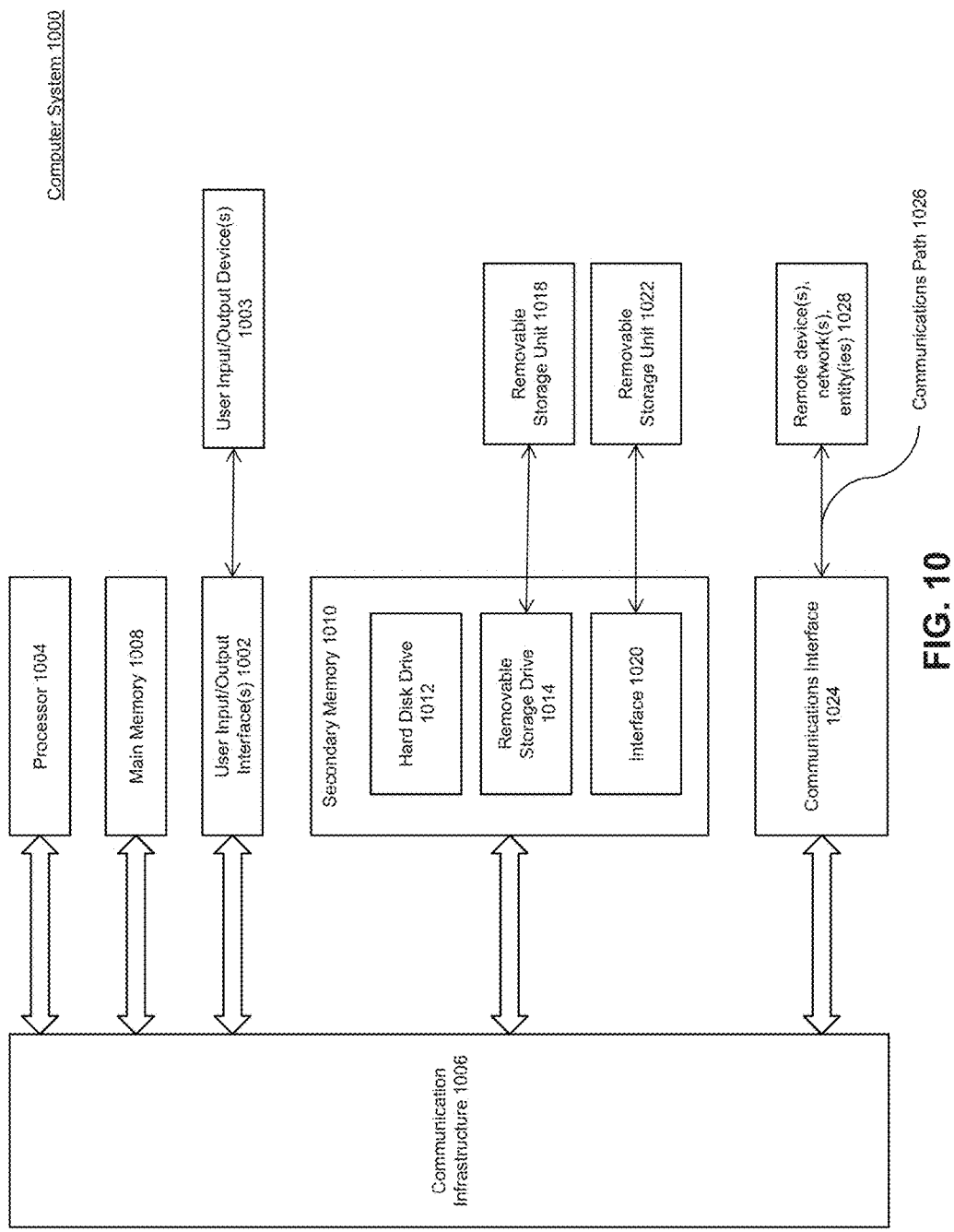
FIG. 10 is an example computer system useful for implementing various embodiments.

Various embodiments can be implemented, for example, using one or more well-known computer systems, such as computer system 1000 shown in FIG. 10. Computer system 1000 can be any well-known computer capable of performing the functions described herein, such as computers available from International Business Machines, Apple, Sun, HP, Dell, Sony, Toshiba, etc.

Computer system 1000 includes one or more processors (also called central processing units, or CPUs), such as a processor 1004. Processor 1004 is connected to a communication infrastructure or bus 1006.

One or more processors 1004 may each be a graphics processing unit (GPU). In an embodiment, a GPU is a processor that is a specialized electronic circuit designed to rapidly process mathematically intensive applications on electronic devices. The GPU may have a highly parallel structure that is efficient for parallel processing of large blocks of data, such as mathematically intensive data common to computer graphics applications, images and videos.

Computer system 1000 also includes user input/output device(s) 1003, such as monitors, keyboards, pointing devices, etc., which communicate with communication infrastructure 1006 through user input/output interface(s) 1002.

Computer system 1000 also includes a main or primary memory 1008, such as random access memory (RAM). Main memory 1008 may include one or more levels of cache. Main memory 1008 has stored therein control logic (i.e., computer software) and/or data.

Computer system 1000 may also include one or more secondary storage devices or memory 1010. Secondary memory 1010 may include, for example, a hard disk drive 1012 and/or a removable storage device or drive 1014. Removable storage drive 1014 may be a floppy disk drive, a magnetic tape drive, a compact disk drive, an optical storage device, tape backup device, and/or any other storage device/drive.

Removable storage drive 1014 may interact with a removable storage unit 1018. Removable storage unit 1018 includes a computer usable or readable storage device having stored thereon computer software (control logic) and/or data. Removable storage unit 1018 may be a floppy disk, magnetic tape, compact disk, DVD, optical storage disk, and/any other computer data storage device. Removable storage drive 1014 reads from and/or writes to removable storage unit 1018 in a well-known manner.

According to an exemplary embodiment, secondary memory 1010 may include other means, instrumentalities or other approaches for allowing computer programs and/or other instructions and/or data to be accessed by computer system 1000. Such means, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1000 may further include a communication or network interface 1024. Communication interface 1024 enables computer system 1000 to communicate and interact with any combination of remote devices, remote networks, remote entities, etc. (individually and collectively referenced by reference number 1028). For example, communication interface 1024 may allow computer system 1000 to communicate with remote devices 1028 over communications path 1026, which may be wired and/or wireless, and which may include any combination of LANs, WANs, the Internet, etc. Control logic and/or data may be transmitted to and from computer system 1000 via communication path 1026.

In an embodiment, a tangible apparatus or article of manufacture comprising a tangible computer useable or readable medium having control logic (software) stored thereon is also referred to herein as a computer program product or program storage device. This includes, but is not limited to, computer system 1000, main memory 1008, secondary memory 1010, and removable storage units 1018 and 1022, as well as tangible articles of manufacture embodying any combination of the foregoing. Such control logic, when executed by one or more data processing devices (such as computer system 1000), causes such data processing devices to operate as described herein.

Based on the teachings contained in this disclosure, it will be apparent to persons skilled in the relevant art(s) how to make and use the invention using data processing devices, computer systems and/or computer architectures other than that shown in FIG. 10. In particular, embodiments may operate with software, hardware, and/or operating system implementations other than those described herein.

CONCLUSION

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A computer implemented method of verifying a system-on-chip to re-use a common set of software codes between software and hardware domains while achieving hardware-driven verification coverage, comprising:
    employing an interconnect between a processing subsystem and a plurality of peripherals,
        wherein the interconnect includes a plurality of communication protocols, and
        wherein the processing subsystem is linked to a plurality of applications via a plurality of drivers, and
        wherein the processing subsystem comprises at least one of a central processing unit (CPU) or a CPU subsystem; and
    implementing a common set of software codes by at least one of the plurality of applications for a software development process and a hardware verification process; and
    causing the interconnect to configure at least one of the plurality of communication protocols to choose from software models or register-transfer level (RTL) models.

2. The system-on-chip verification method of claim 1, farther comprising, for the software development process:
    causing the interconnect to configure at least one of the plurality of communication protocols to not enforce a timing limitation on one or more transactions between the processing subsystem and at least one of the plurality of peripherals; and
    using programming language models for the interconnect and the at least one of the plurality of peripherals.

3. The system-on-chip verification method of claim 1, further comprising, for the hardware verification process:

causing the interconnect to configure at least one of the plurality of communication protocols to enforce a timing limitation on one or more transactions between the processing subsystem and at least one of the plurality of peripherals; and using RTL models for the interconnect and the at least one of the plurality of peripherals.

4. The system-on-chip verification method of claim 3, further comprising:

causing the interconnect to configure the at least one of the plurality of communication protocols to enforce one or more constraints on the one or more transactions to achieve hardware verification coverage with corner-case transactions covered.

5. The system-on-chip verification method of claim 1, further comprising:

using a programming language model for the processing subsystem.

6. A computer implemented system-on-chip verification system, comprising:

a processing subsystem, wherein the processing subsystem comprises at least one of a central processing unit (CPU) or a CPU subsystem;

an interconnect including a plurality of communication protocols, wherein the interconnect configures at least one of the plurality of communication protocols to choose from software models or register-transfer level (RTL) models;

a plurality of applications linked to the processing subsystem via a plurality of drivers;

a plurality of peripherals linked to the processing subsystem via the interconnect; and a common set of software codes, implemented by at least one of the plurality of applications to perform a software development process and a hardware verification process; and wherein the system-on-chip verification system re-uses a common set of software codes between the software and hardware domains while achieving hardware-driven verification coverage.

7. The system-on-chip verification system of claim 6, wherein, for the software development process, the interconnect configures at least one of the plurality of communication protocols to not enforce a timing limitation on one or more transactions between the processing subsystem and at least one of the plurality of peripherals, and programming language models are used for the interconnect and the at least one of the plurality of peripherals.

8. The system-on-chip verification system of claim 6, wherein, for the hardware verification process, the interconnect configures at least one of the plurality of communication protocols to enforce a timing limitation on one or more transactions between the processing subsystem and at least one of the plurality of peripherals, and RTL models are used for the interconnect and the at least one of the plurality of peripherals.

9. The system-on-chip verification system of claim 8, wherein the interconnect further configures the at least one of the plurality of communication protocols to enforce one or more constraints on the one or more transactions to achieve hardware verification coverage with corner-case transactions covered.

10. The system-on-chip verification system of claim 6, wherein a programming language model is used for the processing subsystem.

11. A tangible computer-readable device having instructions stored thereon that, when executed by at least one computing device, causes the at least one computing device to perform a system-on-chip verification process comprising:

employing an interconnect between a processing subsystem and a plurality of peripherals,
  wherein the interconnect includes a plurality of communication protocols, and
  wherein the processing subsystem is linked to a plurality of applications via a plurality of drivers, and
  wherein the processing subsystem comprises at least one of a central processing unit (CPU) or a CPU subsystem; and implementing a common set of software codes by at least one of the plurality of applications for a software development process and a hardware verification process; and causing the interconnect to configure at least one of the plurality of communication protocols to choose from software models or register-transfer level (RTL) models.

12. The computer-readable device of claim 11, the system-on-chip verification process further comprising, for the software development process:

causing the interconnect to configure at least one of the plurality of communication protocols to not enforce a timing limitation on one or more transactions between the processing subsystem and at least one of the plurality of peripherals; and using programming language models for the interconnect and the at least one of the plurality of peripherals.

13. The computer-readable device of claim 11, the system-on-chip verification process further comprising, for the hardware verification process:

causing the interconnect to configure at least one of the plurality of communication protocols to enforce a timing limitation on one or more transactions between the processing subsystem and at least one of the plurality of peripherals; and using RTL models for the interconnect and the at least one of the plurality of peripherals.

14. The computer-readable device of claim 13, the system-on-chip verification process further comprising:

causing the interconnect to configure the at least one of the plurality of communication protocols to enforce one or more constraints on the one or more transactions to achieve hardware verification coverage with corner-case transactions covered.

15. The computer readable device of claim 11, the system-on-chip verification process further comprising:

using a programming language model for the processing subsystem.

* * * * *